United States Patent
Actis et al.

(10) Patent No.: US 9,537,605 B1
(45) Date of Patent: Jan. 3, 2017

(54) ULTRA-WIDEBAND HIGH-POWER SOLID-STATE TRANSMITTER FOR ELECTRONIC WARFARE APPLICATIONS

(71) Applicant: BAE Systems Information and Electronic Systems Integration Inc., Nashua, NH (US)

(72) Inventors: Robert Actis, Burlington, MA (US); Robert J. Lender, Jr., Pepperell, MA (US); Virginia W. Murray, Mont Vernon, NH (US); Edwin C. Powers, Methuen, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 14/806,206

(22) Filed: Jul. 22, 2015

Related U.S. Application Data

(60) Provisional application No. 62/027,453, filed on Jul. 22, 2014.

(51) Int. Cl.
*H04K 3/00* (2006.01)
*H04B 1/04* (2006.01)

(52) U.S. Cl.
CPC ........ *H04K 3/62* (2013.01); *H04B 1/04* (2013.01); *H04K 2203/24* (2013.01)

(58) Field of Classification Search
CPC ........ H04K 3/62; H04K 2203/24; H04B 1/04; H04B 2001/0408; H04B 10/501; H01L 51/0082; H01L 51/422; H01L 2223/6683
See application file for complete search history.

(56) References Cited

U.S. PATENT DOCUMENTS

| | | | | |
|---|---|---|---|---|
| 5,159,290 | A * | 10/1992 | Bartley | H03F 3/602 330/286 |
| 6,020,848 | A * | 2/2000 | Wallace | H01Q 3/30 330/296 |
| 6,848,500 | B1 * | 2/2005 | Langari | H01L 23/4275 165/10 |
| 7,215,220 | B1 | 5/2007 | Jia | |
| 7,924,097 | B2 | 4/2011 | Lender, Jr. et al. | |
| 8,076,975 | B1 | 12/2011 | Lender, Jr. et al. | |
| 8,476,979 | B1 * | 7/2013 | Simons | H03F 1/0261 330/207 P |
| 9,065,163 | B1 * | 6/2015 | Wu | H01P 3/12 |
| 9,356,564 | B1 * | 5/2016 | Kang | H03F 1/3205 |
| 2002/0084852 | A1 * | 7/2002 | Cook | H03F 3/602 330/286 |
| 2004/0108903 | A1 * | 6/2004 | Channabasappa | H01P 5/16 330/295 |
| 2007/0279133 | A1 * | 12/2007 | Rector | H03F 3/602 330/295 |

(Continued)

*Primary Examiner* — Andrew Wendell
(74) *Attorney, Agent, or Firm* — Daniel J. Long; Davis & Bujold, PLLC

(57) ABSTRACT

An ultra-wideband high-power solid-state transmitter for electronic warfare applications which includes a plurality of wideband Gallium-Nitride (GaN) semiconductor monolithic-microwave integrated circuits (MMICs), a spatial power combiner to sum the aggregate contribution of the MMICs, a wide bandwidth small form factor driver amplifier module to supply the required gain in the transmitter, and a thermal management system.

7 Claims, 3 Drawing Sheets

(56) References Cited

U.S. PATENT DOCUMENTS

| | | | |
|---|---|---|---|
| 2010/0224980 A1* | 9/2010 | Chahal | B81B 7/007 257/690 |
| 2012/0001674 A1* | 1/2012 | Mohamadi | H01P 5/12 327/355 |
| 2012/0268213 A1* | 10/2012 | Actis | H03F 3/195 330/295 |
| 2013/0138416 A1* | 5/2013 | Verspecht | H03F 1/3247 703/13 |

* cited by examiner

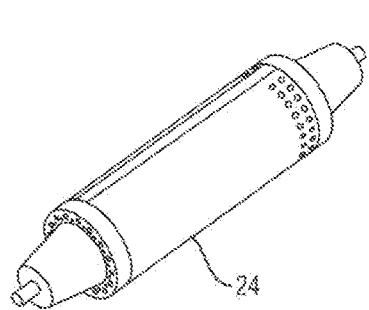
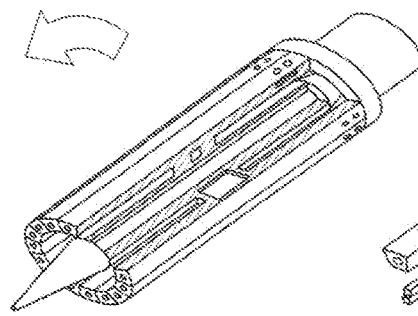
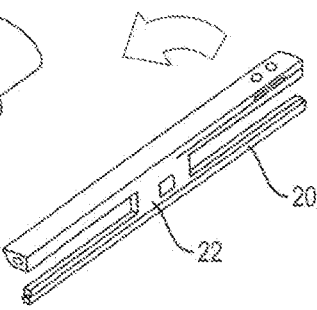
FIG. 2A-1          FIG. 2A-2          FIG. 2A-3
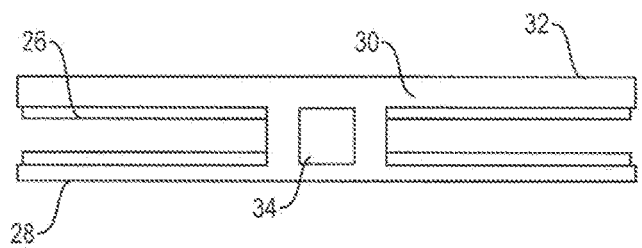
FIG. 2B
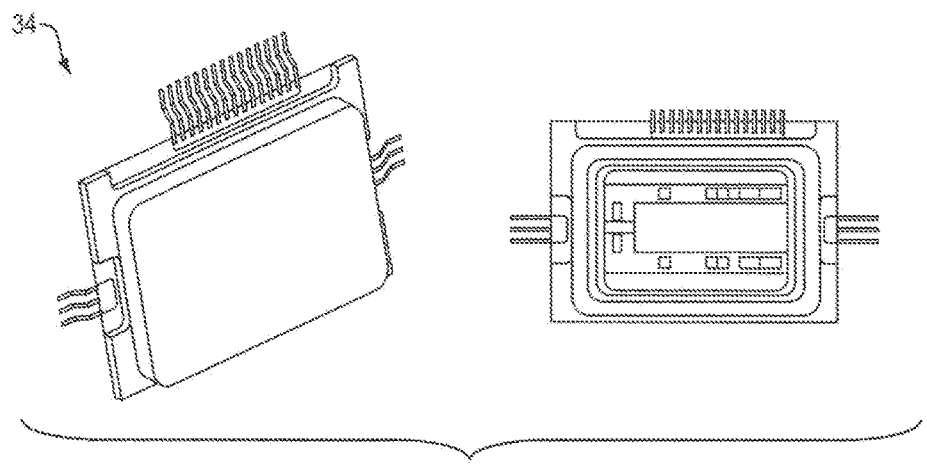
FIG. 2C

ULTRA-WIDEBAND HIGH-POWER SOLID-STATE TRANSMITTER FOR ELECTRONIC WARFARE APPLICATIONS

CROSS REFERENCE TO RELATED APPLICATION

This application claims rights under 35 U.S.C. §119 (e) from U.S. application Ser. No. 62/027,453, filed Jul. 22, 2014, the contents of which are incorporated herein by reference for all purposes.

BACKGROUND OF THE INVENTION

1. Field of the Invention

This invention relates to electronic warfare systems and more particularly, to transmitters for electronic warfare applications.

2. Brief Description of Related Art

The transmitter has been a critical subsystem in all electronic warfare (EW) systems. Currently, only traveling wave tube amplifier (TWTA) technology can provide the combination of frequency bandwidth and radio frequency (RF) power to address many electronic warfare (EW) system transmitter requirements. These tube-base amplifiers require high-voltage power supplies, are physically large, have long warm-up times, have a diminishing number of suppliers, and have reliability concerns.

The component in the transmitter affecting SWaP is the power amplifier, which generates high levels of RF power greater than 9:1 bandwidths in a small volume. Current EW transmitter amplifiers utilize travelling-wave-tube-amplifier (TWTA) technology to generate RF power. However, the tube-based amplifiers have some limitations which impact their ability to address reduced SWaP in the next-generation transmitters. These limitations include: limited frequency coverage to nominal 5:1 bandwidths, the requirement for a very high voltage (KV) power supply, long warm-up times, limited storage life, limited lifetime of reliable operation, and a vanishing number of TWTA suppliers.

A need, therefore, exists for an improved transmitter for use in electronic warfare applications.

BRIEF SUMMARY OF THE INVENTION

The present invention is an ultra-wideband high-power solid-state transmitter for electronic warfare applications. The transmitter includes a plurality of wideband Gallium-Nitride (GaN) semiconductor monolithic-microwave integrated circuits (MMICs). There is also a spatial power combiner to sum the aggregate contribution of the MMICs, a wide bandwidth small form factor driver amplifier module to supply the required gain in the transmitter. The transmitter also includes a thermal management system.

BRIEF DESCRIPTION OF THE DRAWINGS

These and other features of the subject invention will be better understood in connection with the detailed description, in conjunction with the drawings, of which:

FIGS. 2A-1, 2A-2, 2A-3, 2B, and 2C are respectively an exploded cut away perspective view showing a spatial power combiner, a detailed vertical cross sectional view of a blade in the spatial power combiner, and a detailed perspective view of a MMIC in the blade, all in a preferred embodiment of the invention;

FIG. 3 is a schematic drawing showing a 9:1 Bandwidth HPA MMIC in a preferred embodiment of the invention.

DETAILED DESCRIPTION OF THE INVENTION

Figure 1A:
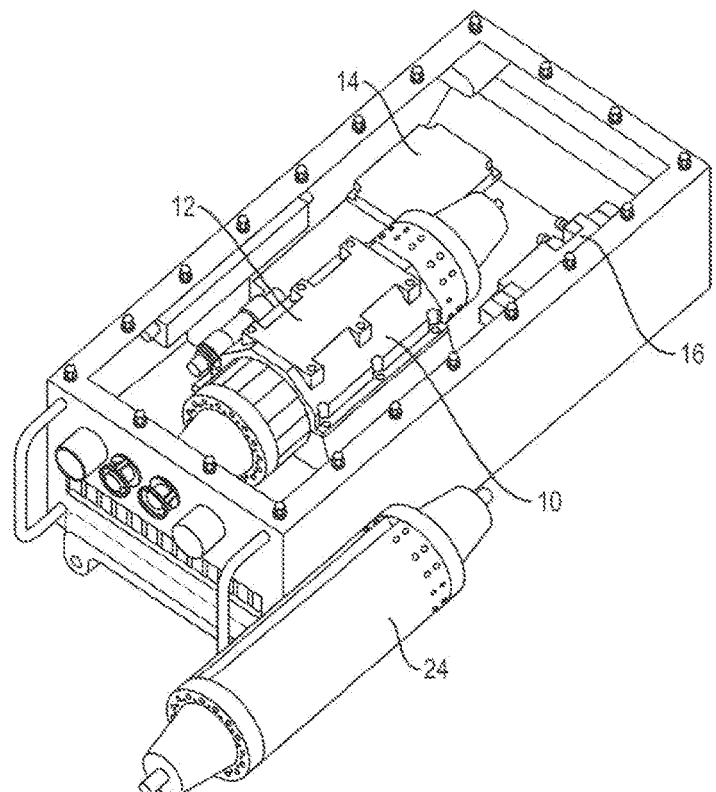
FIGS. 1A and 1B are respectively cut away perspective top and bottom views of a preferred embodiment of self-contained small-form-factor transmitter of the invention.

Referring to the drawings, the present invention addresses the limitations of TWTA technologies for providing reduced SWaP and wider bandwidth. The invention incorporates several technologies in combination: the solid-state-power-amplifier (SSPA) generates the high RF power in the transmitter using wideband Gallium-Nitride (GaN) semiconductor monolithic-microwave-integrated-circuits (MMICs) (FIG. 3); a spatial power combiner to sum the aggregate contribution of multiple Gallium-Nitride (GaN) MMICs (FIG. 2), a wide bandwidth small-form-factor driver amplifier module to supply the required gain in the transmitter, a miniaturized power supply (FIG. 1), and an advanced thermal management system (FIG. 4) to enable a self-contained small-form-factor EW transmitter capable of high RF power over an ultra-wide frequency bandwidth for EW applications. The invention provides a performance capability (RF-power-bandwidth product) in a small-form-factor package that is not currently achievable with tube-based amplifier approaches. The ability to replace TWTAs with more reliable solid-state power amplifier (SSPA) technology capable of providing sufficient RF power over ultra-broadband frequencies requires the availability of sufficiently wideband and high power semiconductor devices, and the ability to power-combine a sufficient number of these devices in a manner offering low loss. Both of these requirements must be satisfied in order to replace the TWTA.

Figure 1B:
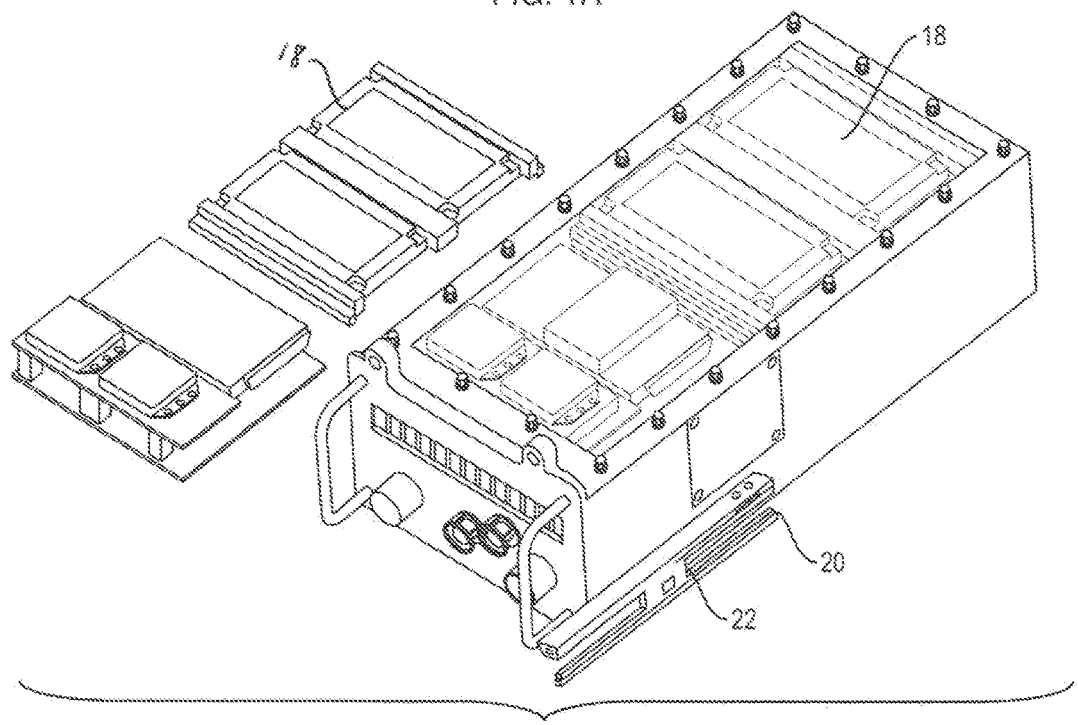

Referring particularly to FIGS. 1A and 1B, the self-contained small-form-factor transmitter of the invention includes a solid state power amplifier 10 which is surrounded by a thermal management system 12. There is also a drive amplifier 14 and a control CCA 16. The transmitter also includes a power supply 18 and a power combiner blade 20 with a PA MMIC die 22. Also shown separately is the spatial power combiner 24. A suitable spatial power converter is commercially available from CAP Wireless Inc. located at 3235 Grande Vista Drive, Newbury Park, Calif. 91320.

Referring to FIGS. 2A-1, 2A-2, 2A-3, 2B, and 2C, the power combiner blade 20 with the PA MMIC die 22 is combined with other similar blades to produce the completed spatial power combiner 24. Referring particularly to FIG. 2B, the power combiner blade includes an antenna board 26, a waveguide tray 28, bias lines 30, a DC feedthrough 32, and a power amplifier module 34. Referring particularly to FIG. 2C, the MMIC is integrated into a hermetic package.

Figure 3:
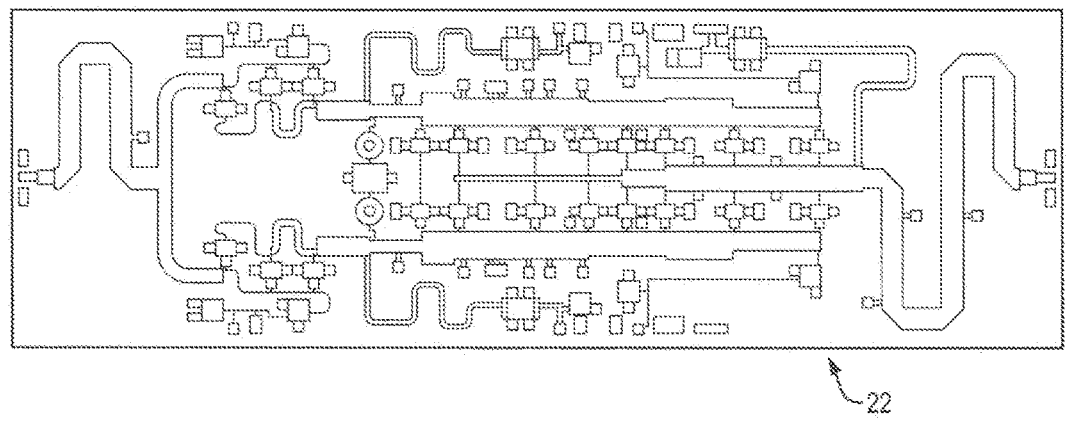

Referring to FIG. 3, the wideband MMIC 22 used in the transmitter is shown which is described in greater detail in U.S. Pat. No. 7,924,097, the contents of which are incorporated by reference herein.

Figure 4:
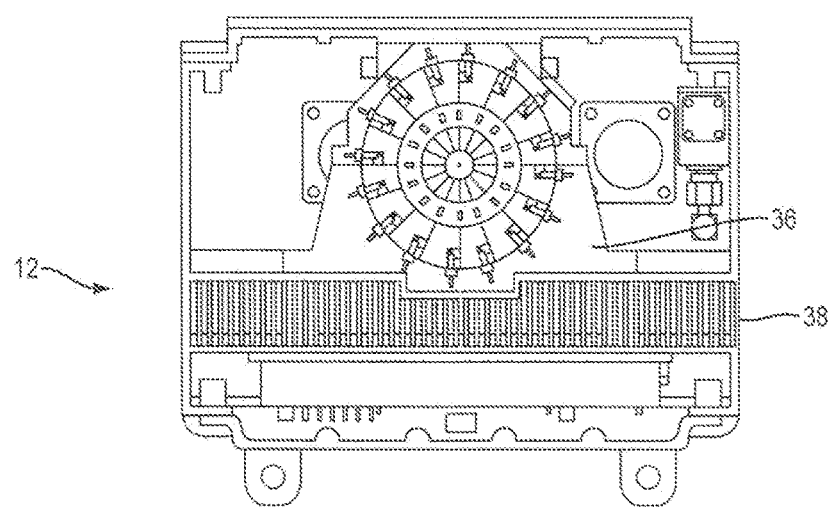
FIG. 4 is a vertical cross sectional view of an air-cooled thermal management system in a preferred embodiment of the invention.

Referring to FIG. 4, it will be seen that the air cooled thermal management system 12 includes a thermal clamp 36 with fins at fin 38 for air cooling.

Those skilled in the art will appreciate that the invention provides a solution for a limitation in tube-based transmitters, which is that the current tube-based transmitters cannot meet the requirement for high RF power over a greater than 9:1 bandwidth. Replacing the tube-based amplifier with a SSPA replacement for the TWTA is a solution to this issue. This is accomplished by integrating an advanced wideband Gallium-Nitride (GaN) monolithic-microwave-integrated-circuit (MMIC) technology, as is disclosed in U.S. Pat. Nos. 7,924,007 and 8,076,975, the contents of which are incorporated herein by reference, with a spatial power combiner. As is described in U.S. Pat. No. 7,215,220, the contents of which are incorporated herein by reference, the spatial combiner integrates 16 GaN MMICs with a 93% combining efficiency over a decade bandwidth. Combining a GaN die with the spatial combiner provides greater than 100 W of RF power from the SSPA over greater than a 9:1 bandwidth.

Integrating the advanced GaN wideband MMIC technology with the spatial combiner enables a true SSPA replacement for a TWTA in terms of both RF output power and frequency bandwidth of operation. The use of an SSPA that can operate over bandwidths much wider than current available from tube-based amplifiers has been a highly desired capability for some core EW counter-measure systems.

As described earlier, the use of the spatially combined SSPA with the performance of the GaN high-power MMICs, enables RF power performance with lower noise power, graceful degradation, no warm-up times, and improved reliability for a lower cost (in both non-recurring and sustainability costs) and overall weight in an EW transmitter system. Combined with a small-form-factor driver amplifier to provide the transmitter with sufficient gain to drive the SSPA, an integrated power supply packaged to comply with the overall transmitter small-form-factor footprint, and a thermal management system of forced cooled air, the self-contained transmitter provides a performance that has been unachievable to date using any tube-based transmitter technology (FIG. 1).

In addition to electronic warfare, the present invention could be used in any application where TWTAs are used. This is applicable at other frequency bands where the combination of wideband GaN MMICs and the spatial combiner perform. Currently there are spatial combiner version that function: 4-18 GHz, 2-20 GHZ and 20-40 GHz.

Those skilled in the art will appreciate that the present invention enables a solid-state solution to replace traditional TWTAs. The present invention reduces size, weight, and power (SWaP), and has enabling technologies in transmitter systems which can provide the combination of high RF power, ultra-wide instantaneous frequency bandwidth and small-form-factor formats.

The present invention provides a transmitter solution that cannot be addressed with any current tube-based amplifier approach. It achieves a combination of wider frequency bandwidth and RF power than is not available using today's TWTAs. Moreover, the present invention provides a solution at a lower cost and a higher reliability than the frequency limited tube-based transmitters.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. An ultra-wideband, high-power, solid-state transmitter for electronic warfare applications comprising,
    at least 16 wideband Gallium-Nitride (GaN) semiconductor monolithic microwave integrated circuits (MMICs);
    a radially configured spatial power combiner with at least 93% combining efficiency to sum the aggregate contribution of the MMICs;
    a wide bandwidth small form factor driver amplifier module to supply the required gain in the transmitter; and
    a thermal management system,
    wherein the transmitter generates RF power of more than 100 W over a decade of bandwidth, 2 to 20 GHz, to form an ultra-wideband, high-power, solid-state transmitter for electronic warfare applications.

2. The transmitter of claim 1 wherein the radially configured spatial power combiner includes at least 16 blades.

3. The transmitter of claim 2 wherein a MMIC is integrated into each of said blades.

4. The transmitter of claim 3 wherein each of the blades also includes an antenna board, a waveguide tray, a bias line, and a DC feedthrough.

5. The transmitter of claim 3 wherein each of said MMIC is integrated into a hermetic package.

6. The transmitter of claim 1 wherein the thermal management system includes a thermal clamp for heat extraction.

7. The transmitter of claim 1 wherein the thermal management system includes a plurality of fins for air cooling.

* * * * *